(12) United States Patent
Rumyankov et al.

(10) Patent No.: US 10,587,508 B2
(45) Date of Patent: Mar. 10, 2020

(54) ETHERNET FRAME TRANSMISSION METHOD IN SOFTWARE DEFINED NETWORKS (SDN)

(71) Applicant: OBSCHESTVO S OGRANICHENNOI OTVETSTVENNOSTYU «PROGRAMMIRUEMYE SETI», Moscow (RU)

(72) Inventors: Alexandr Sergeevich Rumyankov, Nizhny Novgorod (RU); Maksim Valerievich Kaminsky, Moscow (RU); Sergey Ilich Romanov, Moscow (RU)

(73) Assignee: OBSCHESTVO S OGRANICHENNOI OTVETSTVENNOSTYU «PROGRAMMIRUEMYE SETI», Moscow (RU)

( * ) Notice: Subject to any disclaimer, the term of this patent is extended or adjusted under 35 U.S.C. 154(b) by 0 days.

(21) Appl. No.: 16/105,284

(22) Filed: Aug. 20, 2018

(65) Prior Publication Data

US 2018/0359181 A1  Dec. 13, 2018

Related U.S. Application Data

(63) Continuation of application No. PCT/RU2016/050034, filed on Sep. 12, 2016.

(30) Foreign Application Priority Data

May 31, 2016  (RU) .................................. 2015139531

(51) Int. Cl.
*H04L 12/721* (2013.01)
*H04L 12/723* (2013.01)
(Continued)

(52) U.S. Cl.
CPC .............. *H04L 45/66* (2013.01); *H04L 45/50* (2013.01); *H04L 45/64* (2013.01);
(Continued)

(58) Field of Classification Search
CPC ......... H04L 45/66; H04L 45/50; H04L 45/64; H04L 49/351; H04L 49/60; H04L 49/3009; H04L 69/324; H04L 69/325; H04L 69/22
See application file for complete search history.

(56) References Cited

U.S. PATENT DOCUMENTS 8,923,301 B1   12/2014  Verwillow et al.
2007/0028620 A1  2/2007  McMasters et al.
(Continued)

FOREIGN PATENT DOCUMENTS

RU       2584471 C1    5/2016

OTHER PUBLICATIONS

International Search Report from PCT/RU2016/050034 dated Mar. 6, 2017.

*Primary Examiner* — Ian N Moore
*Assistant Examiner* — Brian T Le
(74) *Attorney, Agent, or Firm* — BCF LLP

(57) ABSTRACT

The non-limiting embodiments of the present technology relate to the data transmission technology in packet-switched Software Defined Networks (SDN), comprising switches with Ethernet ports and controlled by software controllers. The aim of this technical solution is to increase network switches' resource efficiency by establishing frame transport path in the network with MPLS transport tags set by the network controller as well as to reduce software functional requirements for OpenFlow switches and controllers by supporting standard frame fields processing.

(Continued)

Method for forming an Ethernet frame and methods for transferring the Ethernet frame are disclosed.

5 Claims, 4 Drawing Sheets

(51) Int. Cl.
| | |
|---|---|
| *H04L 12/935* | (2013.01) |
| *H04L 12/931* | (2013.01) |
| *H04L 29/08* | (2006.01) |
| *H04L 12/715* | (2013.01) |
| *H04L 29/06* | (2006.01) |

(52) U.S. Cl.
CPC ........ *H04L 49/3009* (2013.01); *H04L 49/351* (2013.01); *H04L 49/60* (2013.01); *H04L 69/324* (2013.01); *H04L 69/325* (2013.01); *H04L 69/22* (2013.01)

(56) References Cited

U.S. PATENT DOCUMENTS

| | | |
|---|---|---|
| 2015/0004358 A1 | 1/2015 | Jung |
| 2015/0043589 A1 | 2/2015 | Han et al. |

ETHERNET FRAME TRANSMISSION METHOD IN SOFTWARE DEFINED NETWORKS (SDN)

CROSS REFERENCE

The present application is a continuation of International Patent Application No. PCT/RU2016/050034, filed Sep. 12, 2016, entitled "Method for Transmitting Ethernet Frames over Software Defined Networks (SDN)", which claims priority to Russian Patent Application No. RU 2015139531, filed on May 31, 2016, entitled "Method for Ethernet Frames Transmission Via Software-Configurable Networks (SDN)"; the entirety of both of which is incorporated herein by reference.

TECHNOLOGY FIELD

The present technology relates to the data transmission technology in packet-switched Software Defined Networks (SDN), comprising switches with Ethernet ports and controlled by software controllers.

BACKGROUND

Currently, in SDN networks, packet switching is performed mainly based on MAC layer address information. Such an approach implies that each device must contain a table of switching rules for each MAC address interacting with the network, or forward the packet to a controller for routing, which increases switching delays and reduces network performance. These requirements act as limiting factors for network scalability in case of a large number of users.

There is a known method of data flow control in the domain of packet-switched OpenFlow software defined network (SDN) switches (see US2015043589 (A1)-Dec. 2, 2015). In this method, at least one frame is received at the input port of the input switch of the SDN, the output switch and the output port of the SDN are defined, a most preferable path to the output port is calculated, and the frame is modified by inserting into its header a specially designed address field containing information about the most preferable path to the output port.

Disadvantages of this method include the mandatory insertion of the specially designed address field into the frame's header, as well as a requirement for the software of the switch and the controller to support non-standard field operations.

SUMMARY

The claimed technical solution is designed to eliminate the above-mentioned drawbacks.

The aim of this technical solution is to increase efficiency of use of the resources of network switches by establishing frame transport path in the network using MPLS transport tags, set by the network controller, as well as by reducing functional requirements of software of OpenFlow switches and controllers, by utilizing support of processing standard fields in the frame.

According to one aspect of the present technology, a method of forming an Ethernet frame is provided. The method is executable in a software-define network (SDN), the SDN including (i) a first software-defined switch, (ii) a second software-defined switch, and (iii) at least one intermediate software-defined switch interconnected by respective links, all forming a connected switch graph, the SDN further including a supervisory computing apparatus communicatively coupled to the all software-defined switches. The method is executable by the supervisory computing apparatus, and includes:
  receiving, at an input port of the first software-defined switch, a frame;
  determining, based on the frame being destined to the second software-defined switch, an output port of the second software-defined switch;
  generating, by the supervisory computing apparatus, a most preferable path to the output port;
  encoding, by the supervisory computing apparatus, the most preferable path using with at least one multiprotocol label switching (MPLS) transport tag;
  modifying, by the supervisory computing apparatus, the frame by executing:
    retrieving an embedded protocol identifier (EPI) from one of an Ethertype or a VLAN TPID field of the frame;
    replacing the EPI in the frame with a predefined constant;
    adding an MPLS header to the frame with the MPLS label containing the retrieved EPI;
    adding at least one MPLS header to the frame with the MPLS label encoding the most preferable path;
  sending the modified frame to a next switch according to the most preferable path.

According to another aspect of the present technology, a method of transferring an Ethernet frame is provided, the Ethernet frame having been formed by the method described herein above. The method is executable by the supervisory computing apparatus, and includes:
  receiving, at an input port of the at least one intermediate software-defined switch, the modified frame;
  identifying a value of the EPI of the modified frame;
  responsive to a field value of the EPI satisfying a predetermined condition:
    reading a first MPLS header;
    responsive to an MPLS label from the first MPLS header being within an output port range:
      deleting the first MPLS header tag and reading a second MPLS header tag describing the saved EPI,
      converting the modified frame into an original format of the frame prior to executing the method of claim 1 by deleting the second MPLS header and restoring the Ethertype field in the frame to the saved EPI, and
      sending the frame to an output port specified in the first MPLS label;
  responsive to an MPLS label from the first MPLS header being outside an output port range:
    swapping or removing the MPLS label in the first MPLS header from the frame, and
    sending the modified frame to a next switch according to the most preferable path.

In some implementations, converting the frame into the original format includes inserting a value of second MPLS label into the field of embedded protocol identifier (EPI) of the frame.

BRIEF DESCRIPTION OF THE DRAWINGS

These and other features, aspects and advantages of the present technology will become better understood with regard to the following description, appended claims and accompanying drawings where:

FIG. 1 depicts a schematic diagram of a network suitable for implementing non-limiting implementations of the present technology, and an IEEE 802.1Q frame transfer process according to a non-limiting implementation.

DETAILED DESCRIPTION

Figure 1:
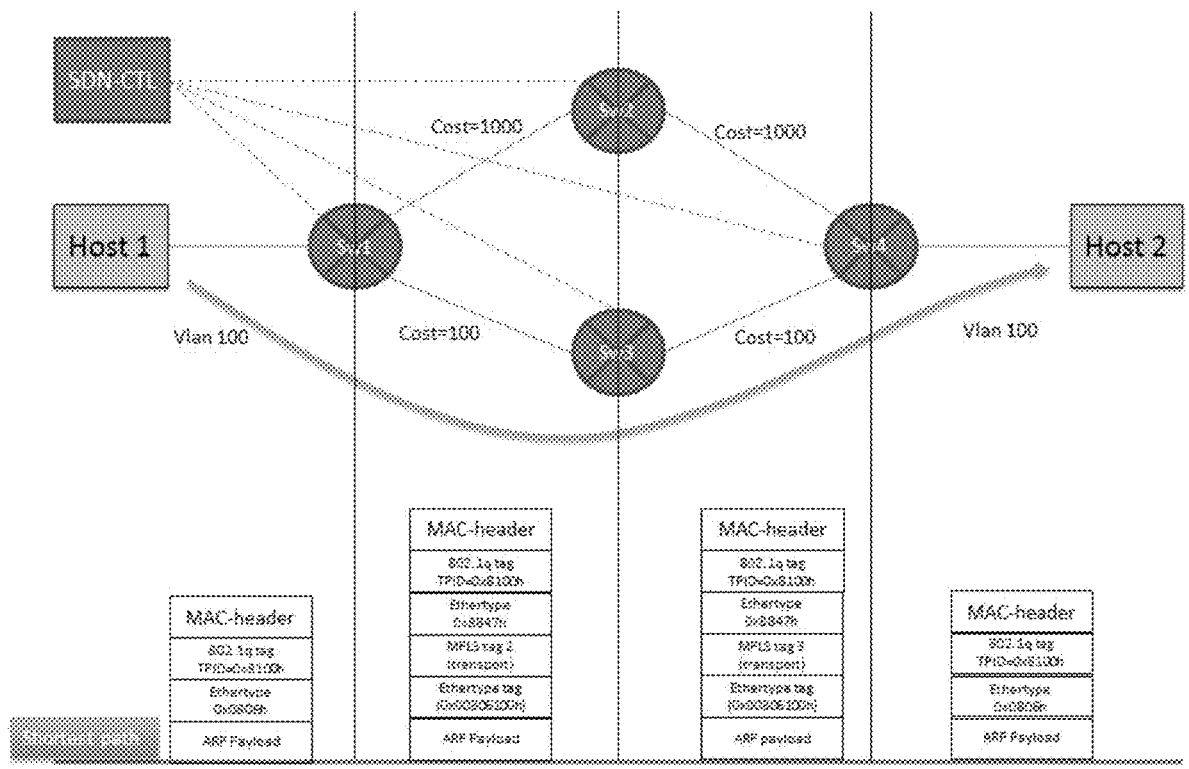

Software defined network (SDN) is a data communication network, in which the level of network management is separated from data transmission devices and is implemented as software. This is a form of virtualization of computing resources.

OpenFlow is a communications protocol for controlling the processing of data that is being transmitted over a data communication network by routers and switches, the protocol implementing the technology of Software Defined Networking.

MAC-address (Media Access Control) is the unique identifier assigned to each unit of active hardware or some of their interfaces in Ethernet computer networks.

Port is a natural number recorded into transport protocol headers of the OSI model (TCP, UDP, SC TP, DCCP). A port is used to define the process—the receiver of the packet within the same host.

Broadcast/broadcasting—one sender, multiple recipients—all devices within the broadcast segment (Example: ARP request).

Multicast/Multicasting—one sender, multiple recipients (Example: IPTV).

IPv4 is the fourth version of the IP protocol described in IETF RFC 791.

IPv4 multicast is a multicast communication using the IPv4 protocol.

Ethernet is a family of standards that define wiring and electrical signals at the physical level, frame format and medium access control protocols to the OSI data link layer.

Frame is a packet of data at the OSI data link layer transmitted over a communication link.

Switch is a device designed for connecting several nodes of a computer network within one or more network segments at the data link (second) layer of the OSI model.

MPLS (Multiprotocol Label Switching) is a mechanism in a high-performance telecommunications network that enables transfer of data from one node of the network to another node of the network using tags.

MAC-learning is a process of filling in a MAC-address table of a switch, based on studying the MAC-address of any sender of a frame to the switch. If there is no MAC-address of the sender in the table, it is recorded into it with reference to the port entered by the frame.

MPLS is scalable mechanism independent of any data transmission protocols. In a network based on MPLS, data packets are assigned tags. The decision of transferring a given data packet further to another node in the network is made only based on the value of the assigned tag without a need to analyze the data packet itself. This allows to create an end-to-end ("straight-through") virtual channel which is independent of the transfer medium and which uses any data transmission protocol.

A Software Defined Network for use with the methods of the present technology comprises at least two OpenFlow switches and at least one SDN controller. The at least two OpenFlow switches are in a mode of exclusive control by the SDN controller (secure mode). In other words, the at least two OpenFlow switches do not commute frames in bypass of the rules set by the controller.

When the network is initialized, the SDN controller determines the network topology and the shortest paths between all possible pairs of switches using Dijkstra's or Bellman-Ford algorithms, using the assigned channel weights between switches. At least one SDN controller encodes each shortest path with a chain of MPLS transport tags or a stack of MPLS transport tags in each segment of the shortest path and sets the corresponding OpenFlow rules of operations with MPLS transport tags in switches whose ports terminate the channels. These rules are set as follows:

at an input switch, a first MPLS transport tag or a stack of MPLS transport tags from the shortest path chain are inserted;

at intermediate switches, the MPLS transport tag or the stack of MPLS transport tags are substituted for the next one from the shortest path chain;

at an output switch, the MPLS transport tag or the stack of MPLS transport tags are removed and the original frame is restored.

A change of the original embedded protocol identifier (EPI) of Ethernet frame may occur at the input switch because of insertion of an MPLS transport tag or a stack of MPLS transport tags. Therefore, the original EPI is saved and recorded into an additional MPLS transport tag—Ethertype Tag, which is inserted into the frame first. For different types of original frames, the EPI is saved in different fields:

for Ethernet II frames, it is saved in EtherType field;

for IEEE 802.3 LLC/SNAP frames, it is saved in PID field of SNAP header;

for IEEE 802.1Q and IEEE 802.1ad frames, it is saved in TPID field of 802.1Q outer header.

The output port of a chain for an incoming frame can be determined by one of the following methods:

1) statically, during configuration of the service (for example, a point-to-point service);

2) dynamically, where SDN controller recognizes the MAC-address (MAC Address Learning) at external ports and remembers the port through which a receiver's MAC-address is accessible (Destination MAC address).

An example of a network and a process of frame transfer is shown in FIG. 1 as exemplified by an IEEE 802.1Q frame.

Switch Sw1 receives frame IEEE 802.1Q at its external input port, comprising the following fields:

MAC-header, where DestinationMAC=Host 2-MAC, SourceMAC=Host1-MAC 802.1Q tag, where VID=100, TPID=0x8100h, vlanPCP—does not have any value Ethertype=0x0806h (EPI of ARP protocol)

Payload=ARP packet

Sw1 switch inserts two MPLS transport tags into the frame:

Ethertype tag with fields Label=0x00806h (copied by Ethertype to low-order bits), TC=vlanPCP (copied from 802.1Q header), BoS=1, TTL=0

MPLS transport tag 2 with fields Label=2, TC=vlanPCP (copied from 802.1Q header), BoS=0, TTL=255

The Ethertype field is set to 0x8847h (EPI of MPLS protocol).

Then the frame is forwarded along the shortest path chain to the channel port to Switch Sw3.

Switch Sw3 analyzes the top MPLS transport tag 2, modifies it by installing MPLS transport tag 3 (Label=3) and sends it to the next switch Sw4 in the shortest path chain.

Switch Sw4 receives the frame, analyzes MPLS transport tag 3, determines that this is the terminal switch and extracts the entire stack of MPLS-tags. Then the lower 4 bytes of Label field from the Ethertype tag are copied into the Ethertype field of the frame and sent to the output port.

Figure 2:
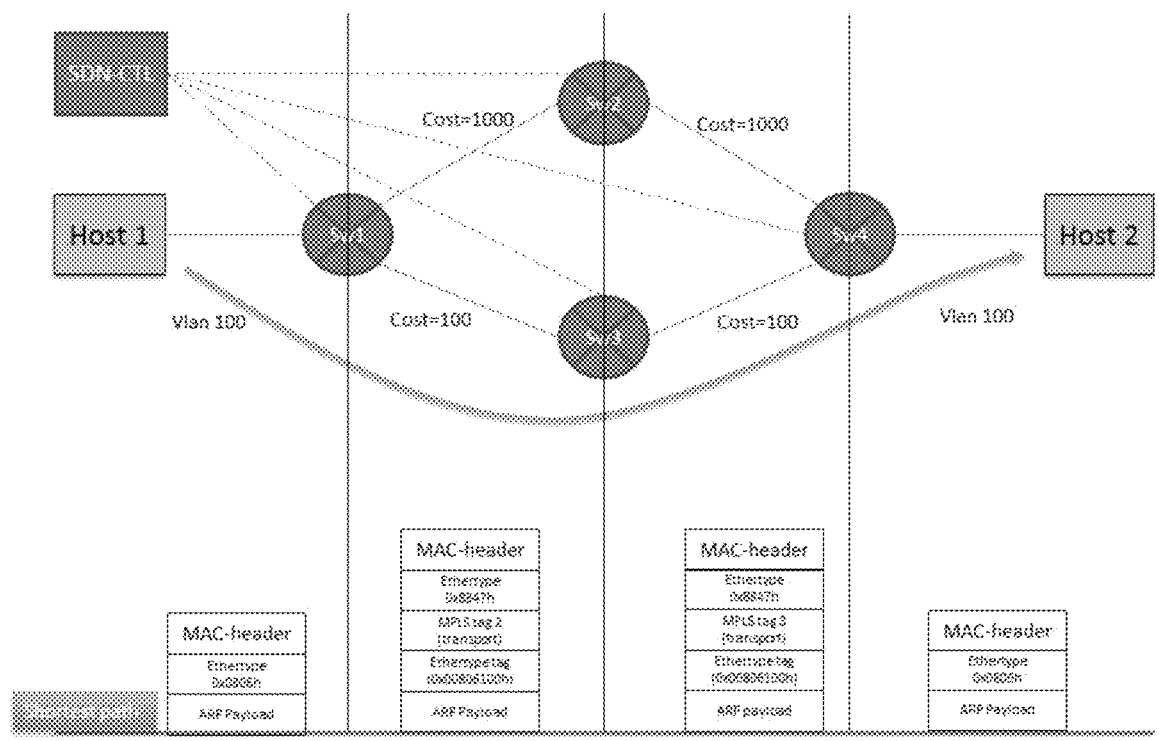
FIG. 2 depicts a schematic diagram of the network of FIG. 1, and an Ethernet II frame transfer process according to a non-limiting implementation.
Figure 3:
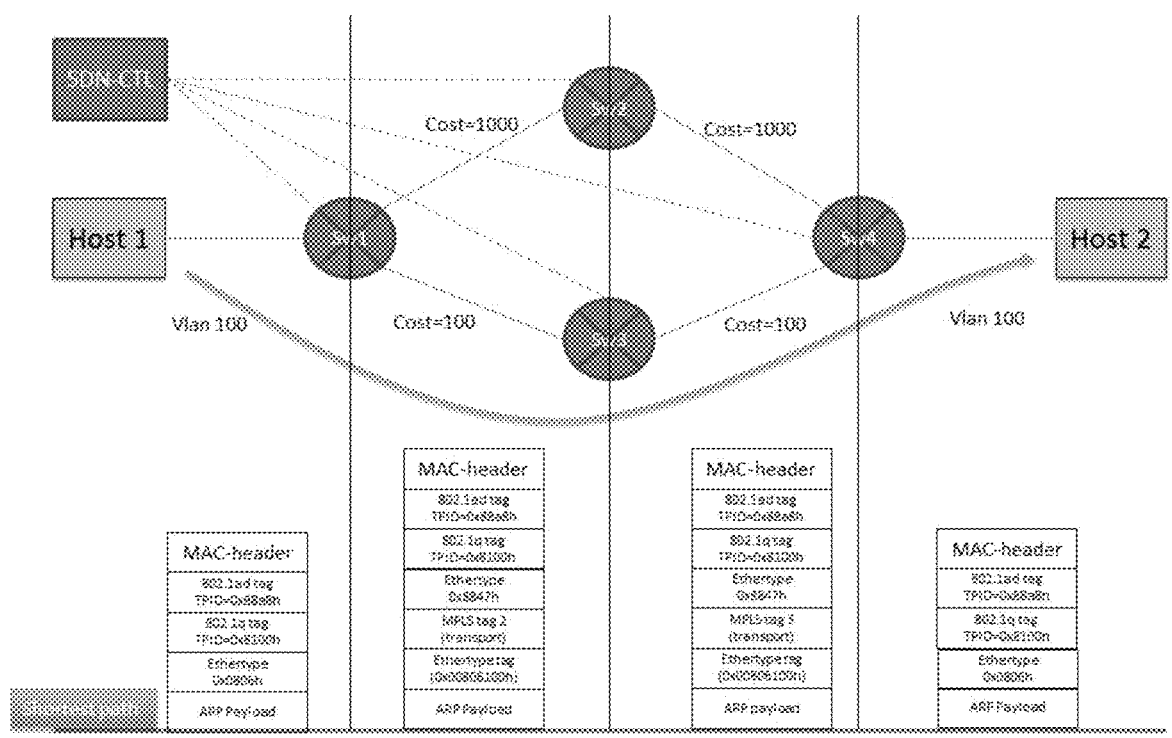
FIG. 3 depicts a schematic diagram of the network of FIG. 1, and an IEEE 802.1ad frame transfer process according to a non-limiting implementation.
Figure 4:
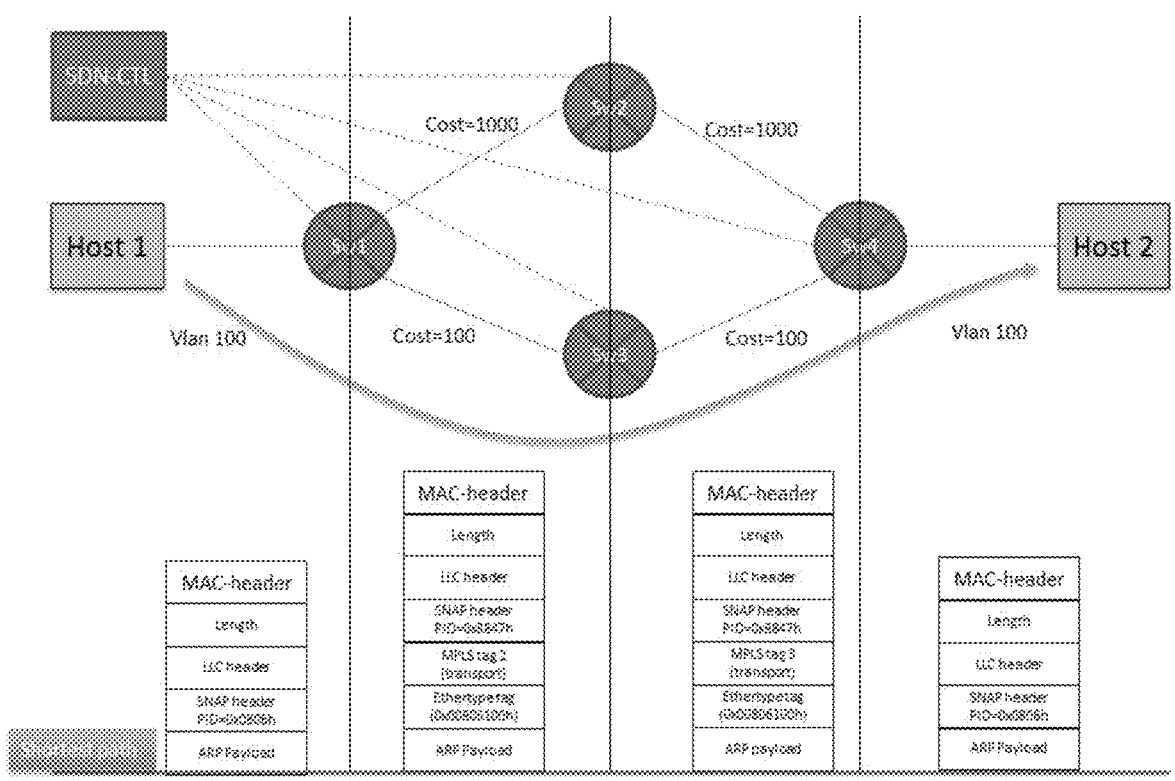
FIG. 4 depicts a schematic diagram of the network of FIG. 1, and an IEEE 802.3 LLC/SNAP frame transfer process according to a non-limiting implementation.

Examples of Ethernet II, IEEE 802.1ad, IEEE 802.3 LLC/SNAP fames transfer processes are shown respectively in FIGS. 2, 3, and 4.

The frame formation method includes the following steps:

At least one frame is received at the input port of the software defined network input switch.

The resulting frame can be Ethernet II, IEEE 802.3 LLC/SNAP, IEEE 802.1Q or IEEE 802.1ad frame.

For at least one received frame, the output network switch and the end output port are determined (based on static configuration or dynamic MAC-learning within the ports of the configured service).

A most preferable path to the output port is calculated using Dijkstra's or Bellman-Ford algorithms and this path is encoded with at least one MPLS-tag.

The received frame is modified by:
saving the field of the embedded protocol identifier (EPI);
replacing the EPI field with EPI of MPLS protocol (0x8847h);
adding MPLS Ethertype tag containing the saved EPI;
adding at least one MPLS transport tag, encoding the preferred path.

The modified frame is sent to a next switch according to the most preferable path.

The claimed frame formation and processing method is industrially applicable, since it uses well-known and tested methods and components.

Although the present technical solution is described with regard to a specific example of its implementation, the description above is non-limiting, and is presented only to illustrate and better describe the technical solution.

The invention claimed is:

1. A method of forming an Ethernet frame, the method executable in a software-define network (SDN), the SDN including (i) a first software-defined switch, (ii) a second software-defined switch, and (iii) at least one intermediate software-defined switch interconnected by respective links, all forming a connected switch graph, the SDN further including a supervisory computing apparatus communicatively coupled to the first software-defined switch, the second software-defined switch, and the at least one intermediate software-defined switch, the method executable by the supervisory computing apparatus, the method comprising:
receiving, at an input port of the first software-defined switch, a frame;
determining, based on the frame being destined to the second software-defined switch, an output port of the second software-defined switch;
generating, by the supervisory computing apparatus, a most preferable path to the output port;
encoding, by the supervisory computing apparatus, the most preferable path using at least one multiprotocol label switching (MPLS) transport tag;
modifying, by the supervisory computing apparatus, the frame by executing:
retrieving an original embedded protocol identifier (EPI) from one of an Ethertype and a VLAN tag protocol identifier (TPID) fields of the frame;
saving the original EPI in an additional MPLS transport tag;
inserting the additional MPLS transport tag, containing the original EPI, into the frame;
replacing the one of the Ethertype and the VLAN (TPID) fields of the frame with a predetermined constant;
inserting the at least one MPLS transport tag into the frame encoding the most preferable path; and
sending the modified frame to a next switch according to the most preferable path.

2. A method of transferring an Ethernet frame, the Ethernet frame having been formed by the method of claim 1, the method executable by the supervisory computing apparatus, the method comprising:
receiving, at an input port of the at least one intermediate software-defined switch, the modified frame;
identifying a value of the one of the Ethertype and the VLAN (TPID) fields of the modified frame;
responsive to field the value of the one of the Ethertype and the VLAN (TPID) fields satisfying a pre-determined condition:
reading the at least one MPLS transport tag;
responsive to the at least one MPLS transport tag being within an output port range:
deleting the at least one MPLS transport tag and reading the additional MPLS transport tag containing the original EPI,
converting the modified frame into an original format of the frame by deleting the additional MPLS transport tag, and
sending the frame to an output port specified in the at least one MPLS transport tag.

3. The method according to claim 2, wherein the converting the modified frame into the original format of the frame further comprises restoring the value of the one of the Ethertype and the VLAN (TPID) fields to the original EPI contained in the additional MPLS transport tag.

4. A method of forming an Ethernet frame, the method executable in a software-define network (SDN), the SDN including (i) a first software-defined switch, (ii) a second software-defined switch, and (iii) at least one intermediate software-defined switch interconnected by respective links, all forming a connected switch graph, the SDN further including a supervisory computing apparatus communicatively coupled to the first software-defined switch, the second software-defined switch, and the at least one intermediate software-defined switch, the method executable by the supervisory computing apparatus, the method comprising:
receiving, at an input port of the first software-defined switch, a frame;
determining, based on the frame being destined to the second software-defined switch, an output port of the second software-defined switch;
generating, by the supervisory computing apparatus, a most preferable path to the output port;
encoding, by the supervisory computing apparatus, the most preferable path using at least one multiprotocol label switching (MPLS) transport tag;
modifying, by the supervisory computing apparatus, the frame by executing:
retrieving an original embedded protocol identifier (EPI) from one of an Ethertype and a VLAN tag protocol identifier (TPID) fields of the frame;

replacing the one of the Ethertype and the VLAN (TPID) fields of the frame with a predetermined constant;

adding the additional MPLS transport tag, containing the original EPI, into the frame;

adding the at least one MPLS transport tag encoding the most preferable path into the frame; and sending the modified frame to a next switch according to the most preferable path;

receiving, at an input port of the at least one intermediate software-defined switch, the modified frame;

identifying a value of the one of the Ethertype and the VLAN (TPID) fields of the modified frame;

responsive to the value of the one of the Ethertype and the VLAN (TPID) fields satisfying a pre-determined condition:

reading the at least one MPLS transport tag;

responsive to the at least one MPLS transport tag being within an output port range:

deleting the at least one MPLS transport tag and reading the additional MPLS transport tag containing the original EPI, converting the modified frame into an original format of the frame by deleting the additional MPLS transport tag, and sending the frame to an output port specified in the at least one MPLS transport tag;

responsive to the at least one MPLS transport tag being outside of the output port range:

swapping or removing the at least one MPLS transport tag from the frame, and sending the modified frame to an other next switch according to the most preferable path.

5. The method according to claim 4, wherein the converting the modified frame into the original format of the frame further comprises inserting the value of the additional MPLS transport tag, containing the original EPI, into the one of the Ethertype and the VLAN (TPID) fields of the frame.

\* \* \* \* \*